United States Patent
Tamm et al.

(10) Patent No.: US 12,325,093 B2
(45) Date of Patent: Jun. 10, 2025

(54) ORBITAL WELDING DEVICE WITH SIMPLIFIED HANDLING

(71) Applicant: ILLINOIS TOOL WORKS INC., Glenview, IL (US)

(72) Inventors: Markus Tamm, Uberlingen (DE); Marcel Foh, Markdorf (DE)

(73) Assignee: Illinois Tool Works Inc., Glenview, IL (US)

( * ) Notice: Subject to any disclaimer, the term of this patent is extended or adjusted under 35 U.S.C. 154(b) by 948 days.

(21) Appl. No.: 17/291,063

(22) PCT Filed: Nov. 1, 2019

(86) PCT No.: PCT/US2019/059298
§ 371 (c)(1),
(2) Date: May 4, 2021

(87) PCT Pub. No.: WO2020/096873
PCT Pub. Date: May 14, 2020

(65) Prior Publication Data
US 2021/0402499 A1   Dec. 30, 2021

(30) Foreign Application Priority Data
Nov. 9, 2018   (EP) ..................................... 18205528

(51) Int. Cl.
*B23K 9/028*   (2006.01)
*B23K 9/095*   (2006.01)
(Continued)

(52) U.S. Cl.
CPC .......... *B23K 9/0286* (2013.01); *B23K 9/0953* (2013.01); *B23K 9/0956* (2013.01); *B23K 37/027* (2013.01); *B23K 2101/06* (2018.08)

(58) Field of Classification Search
CPC .. B23K 9/0286; B23K 9/0953; B23K 9/0956; B23K 37/027; B23K 2101/06;
(Continued)

(56) References Cited

U.S. PATENT DOCUMENTS

| 4,163,886 A | 8/1979 | Omae |
| 5,571,431 A | 11/1996 | Lantieri |
| (Continued) | | |

FOREIGN PATENT DOCUMENTS

| CN | 1473085 | 2/2004 |
| CN | 107107235 | 8/2017 |
| (Continued) | | |

OTHER PUBLICATIONS

Pct, International Search Report and Written Opinion, International Application No. PCT/US2019/059298; date of mailing Jun. 24, 2020, 18 pages.

*Primary Examiner* — Robert G Bachner
(74) *Attorney, Agent, or Firm* — McAndrews, Held & Malloy, Ltd.

(57) ABSTRACT

An orbital welding device (1), having a welding current source (10) in a welding current source housing (11) and a base controller (12), and an orbital welding head (20) connected to the welding current source (10) by a cable (2), the orbital welding head (20) having a pipe mount (21) and a welding electrode holder (22) mounted rotatably with respect to the pipe mount (21) for holding a welding electrode (23). A motor (31) is designed to drive the welding electrode holder (22). The orbital welding head (20) has a chamber (50) for shielding gas, and an electrical circuit (60) that is connected: to a position sensor (41) designed to generate a position value (41.1); and/or to a memory device (61) designed to store one or more loading values (61.1) and/or one or more calibrating values (61.2) in the memory device (61).

16 Claims, 5 Drawing Sheets

(51) Int. Cl.
*B23K 37/02* (2006.01)
*B23K 101/06* (2006.01)

(58) Field of Classification Search
CPC .... B23K 9/162; B23K 37/0276; B23K 9/028; B23K 9/095; B23K 9/16; B23K 37/02; B23K 37/0211
See application file for complete search history.

(56) References Cited

U.S. PATENT DOCUMENTS

| | | | |
|---|---|---|---|
| 5,837,966 A * | 11/1998 | Timmons, Jr. | B23K 9/1274 219/60 A |
| 2004/0238496 A1* | 12/2004 | Kimura | B23K 9/1274 219/60 A |
| 2005/0247686 A1* | 11/2005 | Child | B23K 37/0533 219/60 A |
| 2007/0051711 A1* | 3/2007 | Kachline | B23K 9/28 219/130.01 |
| 2007/0210047 A1 | 9/2007 | Child | |
| 2010/0051586 A1 | 3/2010 | Guerrina | |
| 2016/0125594 A1 | 5/2016 | Becker | |
| 2019/0291200 A1* | 9/2019 | Albright | B23K 9/0953 |

FOREIGN PATENT DOCUMENTS

| | | |
|---|---|---|
| DE | 2741622 C2 | 4/1982 |
| DE | 102004045348 B3 | 3/2006 |
| EP | 2027962 | 2/2009 |
| EP | 1335809 B1 | 1/2013 |
| KR | 101224878 B1 | 1/2013 |
| WO | WO2016153562 A1 | 9/2016 |

* cited by examiner

ORBITAL WELDING DEVICE WITH SIMPLIFIED HANDLING

TECHNICAL FIELD

The invention relates generally to orbital welding devices of so-called closed construction, which form a welding head with a chamber for shielding gas around the pipe ends to be welded.

BACKGROUND

The prior art US20100051586A1 presents one representative of these special welding devices. This type of welding devices is used in particular in the medical or foodstuff sector, where high-quality weld seams, welded in a shielding gas atmosphere, using rust-resistant steels, in the case of often even very small pipe diameters (a few centimeters), are of importance. Accordingly, this construction is distinguished by compact dimensions and easy handling.

The inventors have found it to be disadvantageous that the handling of these special welding devices has weaknesses. For example, a user must define a starting position in accordance with how the user has clamped the welding head to the pipe, must calibrate the electrode rotation mechanism of the welding head, or unexpected failures occur if maintenance intervals are not adhered to.

SUMMARY

The object on which the invention was based was that of improving the above-mentioned disadvantage. The object is achieved by means of the invention, in particular as defined in the independent claims.

In particular, this object is achieved by means of an orbital welding device, the orbital welding device having a welding current source in a welding current source housing and a base controller therein or thereon and having an orbital welding head, which is separate from the welding current source housing and is connected to the welding current source by means of a cable, the orbital welding head having a pipe mount and a welding electrode holder, which is mounted rotatably with respect to the pipe mount and is intended for holding the welding electrode, the orbital welding device having a preferably electric motor, which is preferably controlled by a moto controller, particularly preferably by the base controller, of the orbital welding device, and which is designed to drive the welding electrode holder and thus turn it with respect to the pipe mount, the orbital welding head having a chamber for shielding gas, which is designed to surround a welding electrode of the orbital welding head and substantially seal it off from the outside during a welding process, the orbital welding head having an electrical circuit, preferably in the form of a digital controller,
wherein the electrical circuit is connected:
  to a position sensor, which the orbital welding head in this case has, the position sensor being designed to generate a position value; and/or
  to a memory device, which the orbital welding head in this case has, the electrical circuit being designed to store one or more loading values and/or one or more calibrating values in the memory device.

In particular, this object is furthermore achieved by means of a method for operating an orbital welding device, current being conducted to an orbital welding head from a welding current source by means of a cable, a welding electrode holder being driven by means of a motor and turned with respect to a pipe mount of the orbital welding head, a welding electrode of the orbital welding head being surrounded and substantially sealed off from the outside during a welding process by a chamber for shielding gas, an electrical circuit of the orbital welding head being operated, wherein, by means of the electrical circuit:
  a position value, generated by a position sensor, which the orbital welding head in this case has, is processed; and/or
  one or more loading values and/or one or more calibrating values are stored in a memory device, which the orbital welding head in this case has.

In this way, according to the invention, a welding device is provided with which it is possible to realize various convenience functions. Contrary to the efforts typically made for this type of closed welding heads to keep the welding head as far as possible free from all excess ballast in order to achieve a lightweight and slim construction, provision is made according to the invention whereby the welding head is equipped with the special additional electronics that facilitate the welding process for the user (less calibration necessary, facilitated start of the welding process by incorporation of the position sensor signal instead of exclusively a manual inputting of the orientation in which the welding head has been fastened to the pipe). With corresponding use of a memory, planning of maintenance work can be better defined. This is because the specific loading of the orbital welding head or of the electrode is stored together with the orbital welding head and can be provided for the maintenance independently of the base controller. By storing calibrating data, users are spared the need to perform repeated calibration runs, because the calibrating data specific to the orbital welding head are stored directly in the orbital welding head.

The cable preferably has a minimum length of 1 m, preferably 2 m, particularly preferably 5 m. The pipe mount is preferably a clamping mount formed similarly to a set of tongs. The welding current source is preferably static, whereas the orbital welding head is manually portable.

The chamber is preferably designed such that the pipe pieces that are to be welded to one another are enclosed by the chamber at the ends that are to be connected. The chamber preferably has an inlet, for example with a hose connector, for shielding gas, with which the chamber can thus be filled. The air that was previously present is in this case then forced out of the chamber through the above-stated small gaps or openings. The chamber may also have a dedicated gas outlet.

The chamber is preferably designed such that the welding electrode can be rotated in the chamber around the pipe pieces that are to be welded.

According to the invention, a sensor is to be understood to mean a device for detecting a physical variable and converting this into an electrical signal.

The orbital welding head preferably has a housing which adjoins the chamber and which forms for example a handle for the user or a housing for operator control or switch elements and/or the motor, and the electrical circuit is arranged in the housing.

According to the invention, a value is an item of information regarding a particular magnitude of a technical variable. The value is preferably embodied/coded, preferably digitally, as a state of electrical voltages, magnetizations or optical states. A value is preferably present in time-dependent form in the form of a technical signal, for example an electrical, (electro-)magnetic, optical and/or acoustic analogue, preferably digital signal. A value and also a corresponding signal may have one or more dimensions and thus define a value vector. According to the invention, a measured value is a value determined by means of a sensor.

The position value preferably represents an orientation a) of the pipe mount or b) of the welding electrode or of the welding electrode holder relative to gravitational force. The position value preferably represents at least a roll angle ψ, particularly preferably additionally a pitch angle θ, very particularly preferably also a yaw angle ϕ (see the coordinate system in FIG. 5). The roll angle in particular is of importance in the case of orbital welding, because this significantly influences the orientation of the welding electrode relative to gravitational force, because the pitch angle θ is of rather lesser importance owing to the in most cases horizontally running pipes. The pitch angle however becomes important if the pipes to be welded run obliquely or vertically.

Calibrating data preferably comprise one or more of the following: end stop position, one or more parameters for the conversion of motor input voltage to angular velocity of the motor or of the welding electrode holder or of a gear part.

The position sensor is preferably a gyroscope sensor. The position sensor is preferably designed to measure a position or change in position with respect to at least one, preferably two, particularly preferably three different spatial axes.

In the case of a further orbital welding device according to the invention, provision is made whereby the position sensor is arranged in a fixed relative position with respect to the pipe mount and in a movable relative position with respect to the welding electrode holder, and the position value represents an orientation of the pipe mount with respect to gravitational force.

In this way, by contrast to the positioning of the position sensor on the electrode, a furthermore compact construction of the welding electrode holder and thus of the chamber is made possible, and an electrical rotary leadthrough is avoided.

The position sensor is preferably arranged in the housing.

In the case of a further orbital welding device according to the invention, provision is made whereby the electrical circuit or the base controller is designed to calculate in dependence
on the position value and
on a turn value, which represents the turning of the welding electrode with respect to the pipe mount,
an orientation value, which represents an orientation of the welding electrode or of the welding electrode holder with respect to gravitational force.

In a further method according to the invention, a corresponding value is correspondingly calculated.

In this way, the orientation of the welding electrode can be calculated even though the position sensor is not arranged fixedly with respect to the welding electrode, and said orientation is then incorporated into the open-loop or closed-loop control of the welding process.

The turn value is for example one of, or an average of several of, the following: measured value of an angle encoder, position value of a stepper motor, value of a calculation unit which determines the angular position of the electrode from rotational speed and time of rotation with respect to a defined position (defined for example by means of a limit switch) (so-called "home" position).

In the case of a further orbital welding device according to the invention, provision is made whereby the electrical circuit is designed to pass on to the base controller the position value or the orientation value calculated according to the preceding refinement example. In a further method according to the invention, a corresponding passing-on is performed.

The passing-on from the electrical circuit to the base controller, and/or an accessing of the memory device by the base controller or communication between the electrical circuit and the base controller as mentioned in this description, preferably takes place via a differential interface, for example CAN or RS485.

In the case of a further orbital welding device according to the invention, provision is made whereby the base controller is designed to carry out an open-loop or closed-loop control of a welding process in dependence on the position value or the orientation value.

Corresponding closed-loop control or open-loop control is performed in a further method according to the invention.

In this way, the different orientations in which the orbital welding device can be attached to the pipe by means of the pipe mount can be identified and automatically compensated in the welding process. In the case of orbital welding, it must for example be taken into account that, owing to gravitational force, the weld seam forms differently at different regions as the welding electrode moves around the pipe. Since a uniform weld seam is desired, the welding process is therefore performed with different parameters in a manner dependent on the position of the welding electrode.

In the case of a further orbital welding device according to the invention, provision is made whereby the base controller is designed to load a stored welding process program from a memory and the open-loop or closed-loop control of the welding process includes a run of the welding process program, the base controller being designed to shift a starting point, at which the run of the welding process program begins, and preferably an endpoint, at which the run of the welding process program ends, in dependence on the position value.

In a further method according to the invention, corresponding loading and shifting is performed.

In this way, the position value can be incorporated into the open-loop control or closed-loop control of the welding process in a simple manner.

The welding process program preferably comprises a table or function in which, for a particular angular position of the welding electrode relative to the welding electrode holder, one or more parameters (for example current intensity) for the closed-loop control or open-loop control of the welding current source are stored or calculated.

In the case of a further orbital welding device according to the invention, provision is made whereby the orbital welding device has a display unit, which is designed to present a graphic representation of the orientation of the welding electrode with respect to gravitational force, the orbital welding device being designed to turn and/or tilt the graphic representation in dependence on the position value, preferably several times within a second, in order to present changes in the position value.

In a further method according to the invention, a corresponding presentation is correspondingly displayed.

In this way, a user can see the orientation on the display unit and, for example, correct it.

In the case of a further orbital welding device according to the invention, provision is made whereby the electrical circuit is designed to store in the memory device
a) a number and/or a time period and/or a maximum current and/or a current accumulated over time, corresponding to an electrical charge, of the welding processes carried out with the welding electrode or the orbital welding head and/or arcs and/or b) a number of specific vibrations, for example exceeding a or various threshold values, and/or c) an operating time of the motor as the one or more loading values.

In a further method according to the invention, corresponding storage is performed.

A good prediction of part failures that are to be expected is possible by means of these loading values.

In the case of a further orbital welding device according to the invention, provision is made whereby the orbital welding device, preferably the orbital welding head, has a loading sensor and the electrical circuit or the base controller is designed to determine one or more of the loading values from a measured value of the loading sensor.

In a further method according to the invention, a corresponding determination is performed.

In this way, the loading values are measurable by means of the orbital welding device.

The loading sensor preferably has a current sensor (for example current sensor of the motor current or of the current conducted into the welding electrode) and/or an acceleration sensor (for measuring the vibrations). The acceleration sensor is preferably a position sensor. It is preferably the same sensor that already serves as a position sensor in the preceding refinement examples.

The loading sensor is preferably composed of various elements, which are preferably arranged in a distributed manner in the orbital welding head and the welding current source housing.

In the case of a further orbital welding device according to the invention, provision is made whereby the orbital welding head at least partially has the loading sensor, and the orbital welding head having a battery, and the orbital welding head being designed to operate the part of the loading sensor that the orbital welding head has with the aid of the electrical energy provided by the battery and to store one or more of the loading values in the memory device by means of the electrical circuit.

In a further method according to the invention, corresponding operation of the loading sensors and corresponding storage are performed.

In this way, consideration is also given to loads on the orbital welding head that arise when the orbital welding head is not connected to the welding current source, for example during transport or storage.

In the case of a further orbital welding device according to the invention, provision is made whereby the electrical circuit is designed to receive one or more of the loading values from the base controller.

In a further method according to the invention, one or more loading values are received from the base controller by means of the electrical circuit.

In this way, loading values can be stored in the memory device by means of the base controller.

In the case of a further orbital welding device according to the invention, provision is made whereby the base controller or the electrical circuit is designed to read out one or more of the loading values, directly or indirectly via the electrical circuit, from the memory device and to emit an alarm signal if one or more of the loading values exceeds a threshold value predefined for the respective loading value.

In a further method according to the invention, corresponding reading-out and emitting of an alarm are performed.

In this way, the need for maintenance or a replacement of parts is signalled to the user, wherein it is not of importance here what current source and what base controller have previously been used to perform welding processes. The orbital welding head can be operated with different current sources because the loading information items are stored directly in the orbital welding head. The alarm signal may be for example visual, haptic or acoustic. For example, it is an LED display on the orbital welding head (for example flashing LED) or the current source or a pop-up window on a screen of the orbital welding head or of the current source.

In the case of a further orbital welding device according to the invention, provision is made whereby the base controller or the electrical circuit is designed to carry out a calibrating run of the motor and thereby generate the one or more calibrating values. In a further method according to the invention, corresponding calibration and storage are performed.

In this way, calibrating values can be generated by the orbital welding device.

The electrical circuit is preferably designed to receive one or more of the calibrating values from the base controller. The base controller is preferably designed to read out one or more of the calibrating values, directly or indirectly via the electrical circuit, from the memory device, and to perform open-loop control or closed-loop control of a welding process in a manner dependent on the one or more read-out calibrating values.

Preferably, for the calibration of the velocity calculation, that is to say calculation of the angular velocity of the motor or of the welding electrode holder or of a gear part on the basis of the motor input voltage, the following calibration for calculating one or more parameters for converting motor input voltage to angular velocity of the motor or of the welding electrode holder or of a gear part is performed, or the base controller or the electrical circuit is designed to carry out the following calibration:

activating the motor with a defined voltage u1;

detecting a specific first angular position φ1 (for example by means of a position switch or angle encoder) of the motor or of the welding electrode holder or of a gear part and starting a time measurement at t1;

detecting a specific second angular position φ2 (for example by means of a position switch or angle encoder) of the motor or of the welding electrode holder or of a gear part and stopping the time measurement at t2;

calculating a parameter p as the calibrating value for converting the motor input voltage u1 into the angular velocity ω1 of the motor or of the welding electrode holder or of a gear part in dependence on φ1, φ2, t1 and t2, preferably as $p=(φ2−φ1)/(t2−t1)$.

The first and second angular positions may be detected by means of different position switches, but particularly preferably by a single position switch, wherein φ2−φ1 is then equal to 360°.

In the case of a further orbital welding device according to the invention, provision is made whereby the base controller or the electrical circuit is designed to emit an alarm signal (with regard to preferred embodiments of an alarm signal, see above) if the one or more calibrating values (generated for example by means of a short calibrating run according to the invention performed beforehand) differ from one or more calibrating values already present in the memory device (generated for example by means of a calibrating run according to the invention performed in the more distant past) by more than a predetermined amount. In the case of a further method according to the invention, an alarm signal is correspondingly output.

In this way, wear phenomena can be identified and displayed to the user, such that precautionary maintenance of the orbital welding device can for example be performed. Since the calibration data are stored in the welding head, wear detection specific to the welding head is thus realized, and it is not imperatively necessary for the calibration to always be performed with the same welding current source. It is particularly preferable for the electrical circuit in the welding head to be designed to generate the calibration data and/or output the alarm signal independently of the base controller—the welding head is thus, with regard to this wear detection, partially or even entirely independent of the welding current source.

Preferably, the abovementioned parameter p is generated as calibrating value (for example before the first use of the orbital welding head) and written into the memory unit, for example during a first calibrating run. After a certain period of time (for example one year), a calibrating run is performed again, and the newly generated parameter p_neu is compared with the previously stored parameter p. If p_neu is smaller than p by a predetermined amount (for example p_neu≤0.75*p), this may for example be because the gear has accumulated dirt and therefore the angular velocity is lower, for the same motor voltage, than at the time of the first calibrating run. Through outputting of an alarm signal, this wear can thus be easily identified by the user.

In the case of a further orbital welding device according to the invention, provision is made whereby the base controller or the electrical circuit is designed to measure the position value or a part of the position value at the beginning, during or at the end of a welding operation and store it in a log file relating to the welding operation. In a further method according to the invention, corresponding measurement and storage are performed.

In this way, the actual orientation of the weld seam and/or of the pipe can be logged and thus checked. Thus, at the same time as the welding, the orientation of the pipe system at the various weld seams is "mapped". It is thus particularly preferably the case, for example, that the correct pitch angle (see FIG. 5) in the case of obliquely (that is to say non-horizontally) running pipes is logged.

BRIEF DESCRIPTION OF THE DRAWINGS

The invention will now be illustrated in more detail by way of example on the basis of drawings, in which.

DETAILED DESCRIPTION

Figure 1:
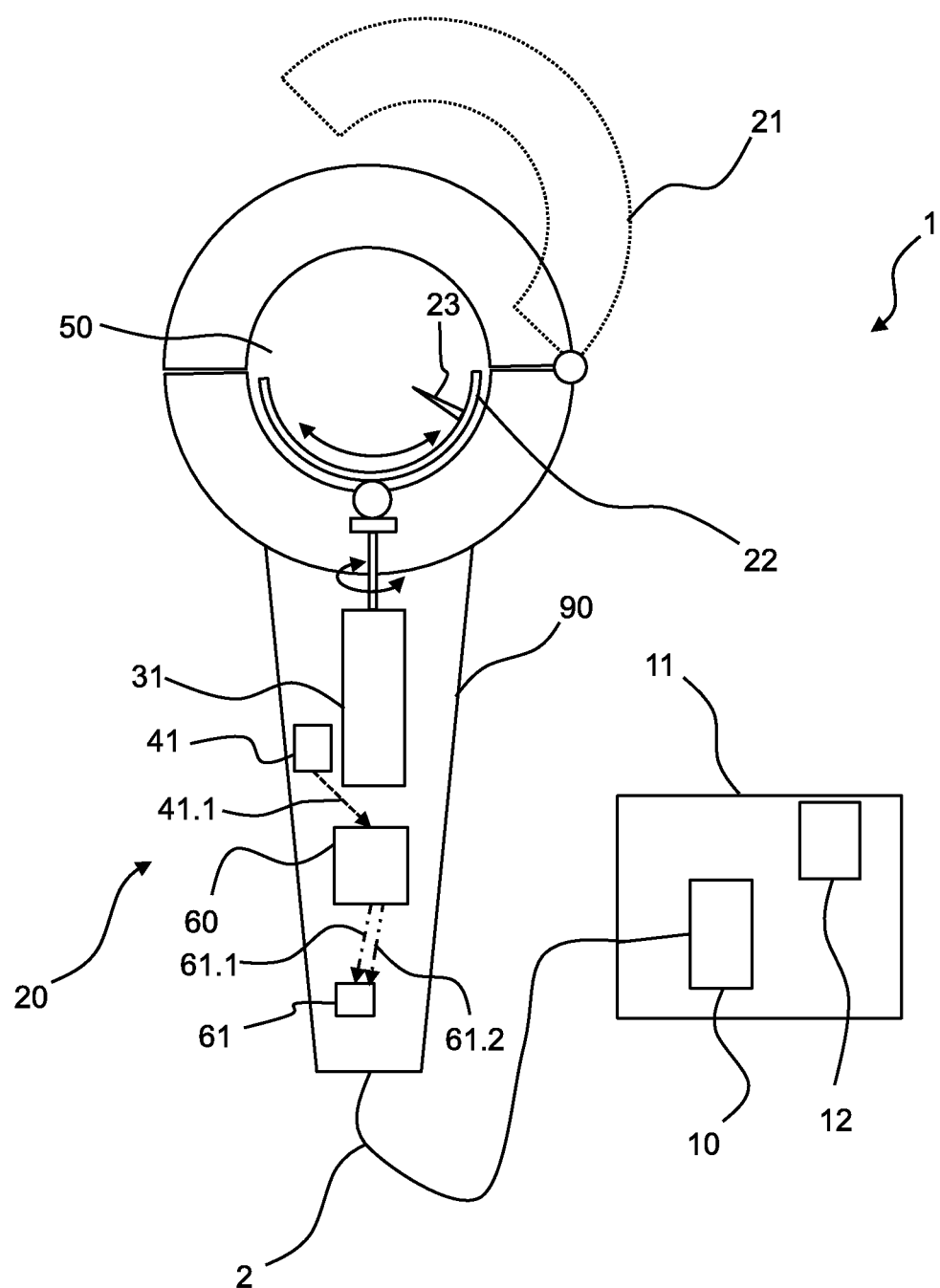
FIG. 1 shows a first embodiment of a device according to the invention.

A detailed description of FIG. 1 will be given below. The embodiment is such that the orbital welding device 1 has a welding current source 10 in a welding current source housing 11 and a base controller 12 therein and has an orbital welding head 20, which is separate from the welding current source housing 11 and is connected to the welding current source 10 by means of a cable 2, the orbital welding head 20 having a pipe mount 21 and a welding electrode holder 22, which is mounted rotatably with respect to the pipe mount 21 and is intended for holding the welding electrode 23, the orbital welding device 1 having an electric motor 31, which is activated by the base controller 12 of the orbital welding device 1 and which is designed to drive the welding electrode holder 22 and thus turn it with respect to the pipe mount 21, the orbital welding head 20 having a chamber 50 for shielding gas, which is designed to surround a welding electrode 23 of the orbital welding head 20 and substantially seal it off from the outside during a welding process, the orbital welding head 20 having an electrical circuit 60 in the form of a digital controller, wherein the electrical circuit 60 is connected:

to a position sensor 41, which the orbital welding head 20 in this case has, the position sensor 41 being designed to generate a position value 41.1; and/or to a memory device 61, which the orbital welding head 20 in this case has, the electrical circuit 60 being designed to store one or more loading values 61.1 and/or one or more calibrating values 61.2 in the memory device.

During the operation of the orbital welding device (1), provision is made whereby current is conducted to the orbital welding head 20 from the welding current source 10 by means of the cable 2, the welding electrode holder 22 being driven by means of the motor 31 and turned with respect to the pipe mount 21 of the orbital welding head 20, the welding electrode 23 of the orbital welding head 20 being surrounded and substantially sealed off from the outside during a welding process by the chamber 50 for shielding gas, the electrical circuit 60 of the orbital welding head 20 being operated, wherein, by means of the electrical circuit 60:

the position value 41.1, generated by the position sensor 41, which the orbital welding head 20 in this case has, is processed; and/or the one or more loading values 61.1 and/or the one or more calibrating values 61.2 are stored in the memory device 61, which the orbital welding head 20 in this case has.

Depending on the embodiment, the device 1 has the position sensor 41 or the memory 61 or both.

Here, the cable 2 has a minimum length of 2 m. The pipe mount 21 is a clamping mount formed similarly to a set of tongs. The chamber 50 is designed such that the pipe pieces that are to be welded to one another are enclosed by the chamber 50 at the ends that are to be connected. The chamber 50 has an inlet, for example with a hose connector, for shielding gas, with which the chamber can thus be filled. The chamber 50 is designed such that the welding electrode 23 can be rotated in the chamber 50 about the pipe pieces that are to be welded. Here, the orbital welding head 20 has a housing 90 which adjoins the chamber 50 and which forms for example a handle for a user or a housing for operator control or switch elements and/or the motor 31, and the electrical circuit 60 is arranged in the housing 90.

The embodiment is such that the position sensor 41 is arranged in a fixed relative position with respect to the pipe mount 21 and in a movable relative position with respect to the welding electrode holder 22 and the position value 41.1 represents an orientation of the pipe mount 21 with respect to gravitational force. Here, the position sensor 41 is arranged in the housing 90. The embodiment is such that the electrical circuit 60 is designed to store in the memory device 61 a) a number and/or a time period and/or a maximum current and/or a current accumulated over time, corresponding to an electrical charge, of the welding processes carried out with the welding electrode 23 or the orbital welding head 20 and/or arcs and/or b) a number of specific vibrations, for example exceeding a or various threshold values, and/or c) an operating time of the motor 31 as the one or more loading values 61.1, by contrast to the situation in FIG. 2.

Figure 2:
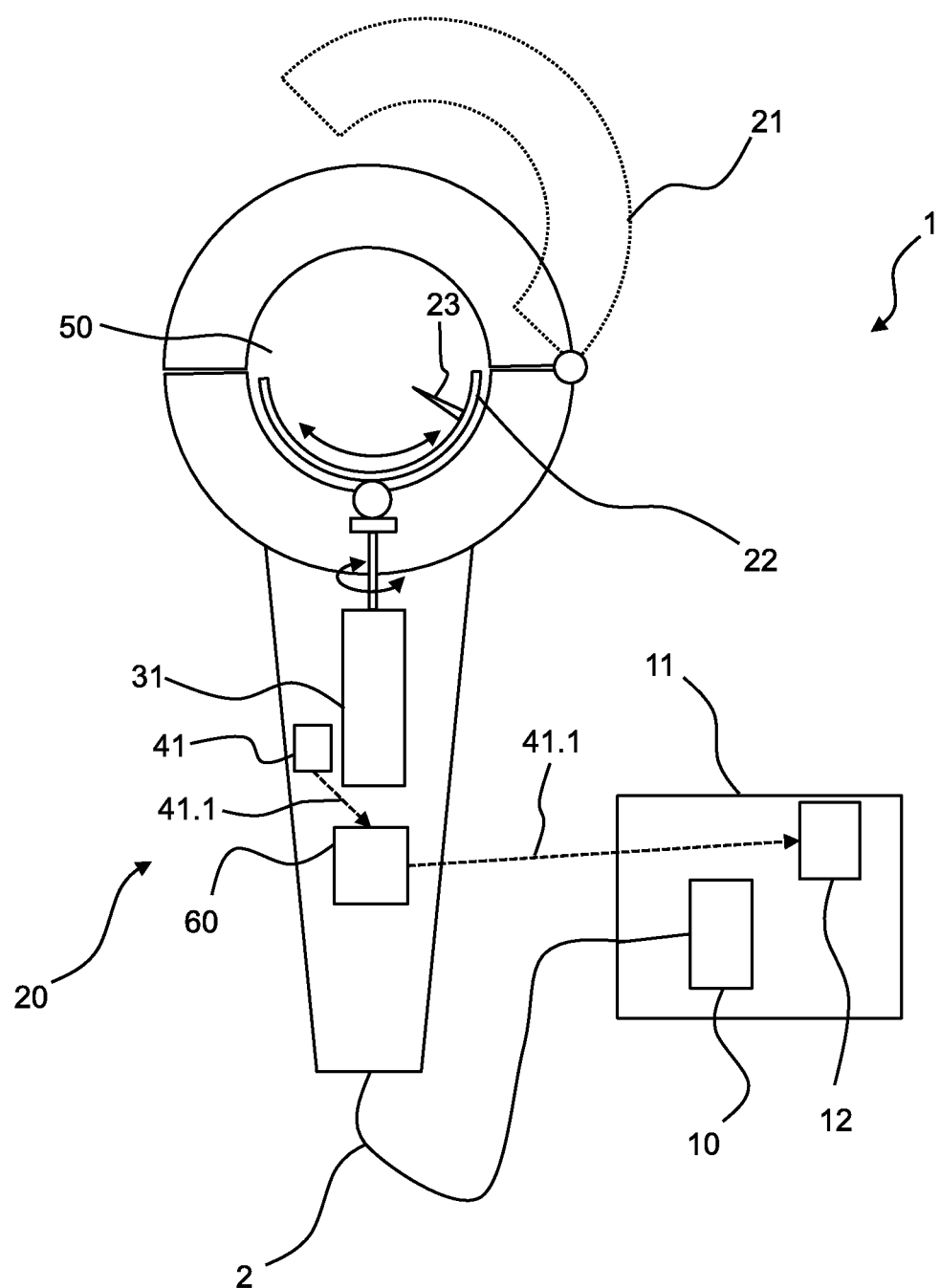
FIG. 2 shows a second embodiment, based on the first embodiment, of a device according to the invention.

A more detailed description of FIG. 2 will be given below. The embodiment is such that the base controller 12 is designed to calculate in dependence
on the position value 41.1 and
on a turn value, which represents the turning of the welding electrode 23 with respect to the pipe mount 21, an orientation value, which represents an orientation of the welding electrode 23 or of the welding electrode holder 22 with respect to gravitational force. The embodiment is such that the electrical circuit 60 is designed to pass on to the base controller 12 the position value 41.1, the base controller 12 being designed to carry out an open-loop or closed-loop control of a welding process in dependence on the position value 41.1 and the orientation value. The embodiment is such that the base controller 12 is designed to load a stored welding process program from a memory, the open-loop or closed-loop control of the welding process including a run of the welding process program, the base controller 12 being designed to shift a starting point, at which the run of the welding process program begins, and an endpoint, at which the run of the welding process program ends, in dependence on the position value 41.1.

Figure 3:
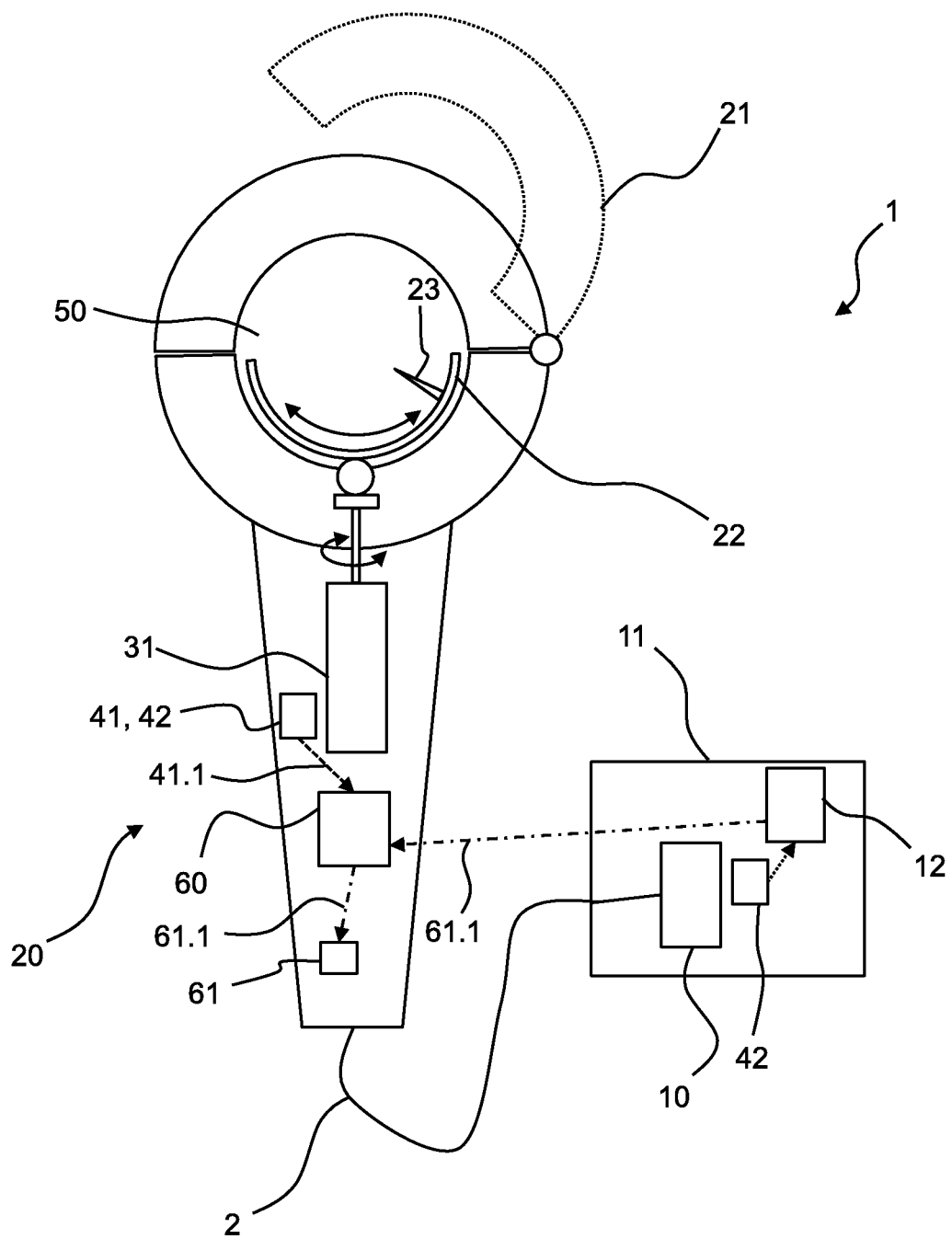
FIG. 3 shows a third embodiment, based on the first embodiment, of a device according to the invention.

A more detailed description of FIG. 3 will be given below. The embodiment is such that the orbital welding device 1 has a loading sensor 42 and the electrical circuit 60 or the base controller 12 is designed to determine one or more of the loading values 61.1 from a measured value of the loading sensor 42. The loading sensor 42 in this case has a current sensor of the motor current and of the current conducted into the welding electrode and has an acceleration sensor (for measuring the vibrations). The acceleration sensor is in this case a position sensor 41. It is the same sensor that already serves as a position sensor 41 in the preceding exemplary embodiments. The loading sensor 42 is in this case composed of various elements, which are arranged in a distributed manner in the orbital welding head 20 and the welding current source housing 11. The embodiment is such that the electrical circuit 60 is designed to receive one or more of the loading values 61.1 from the base controller 12.

Figure 4:
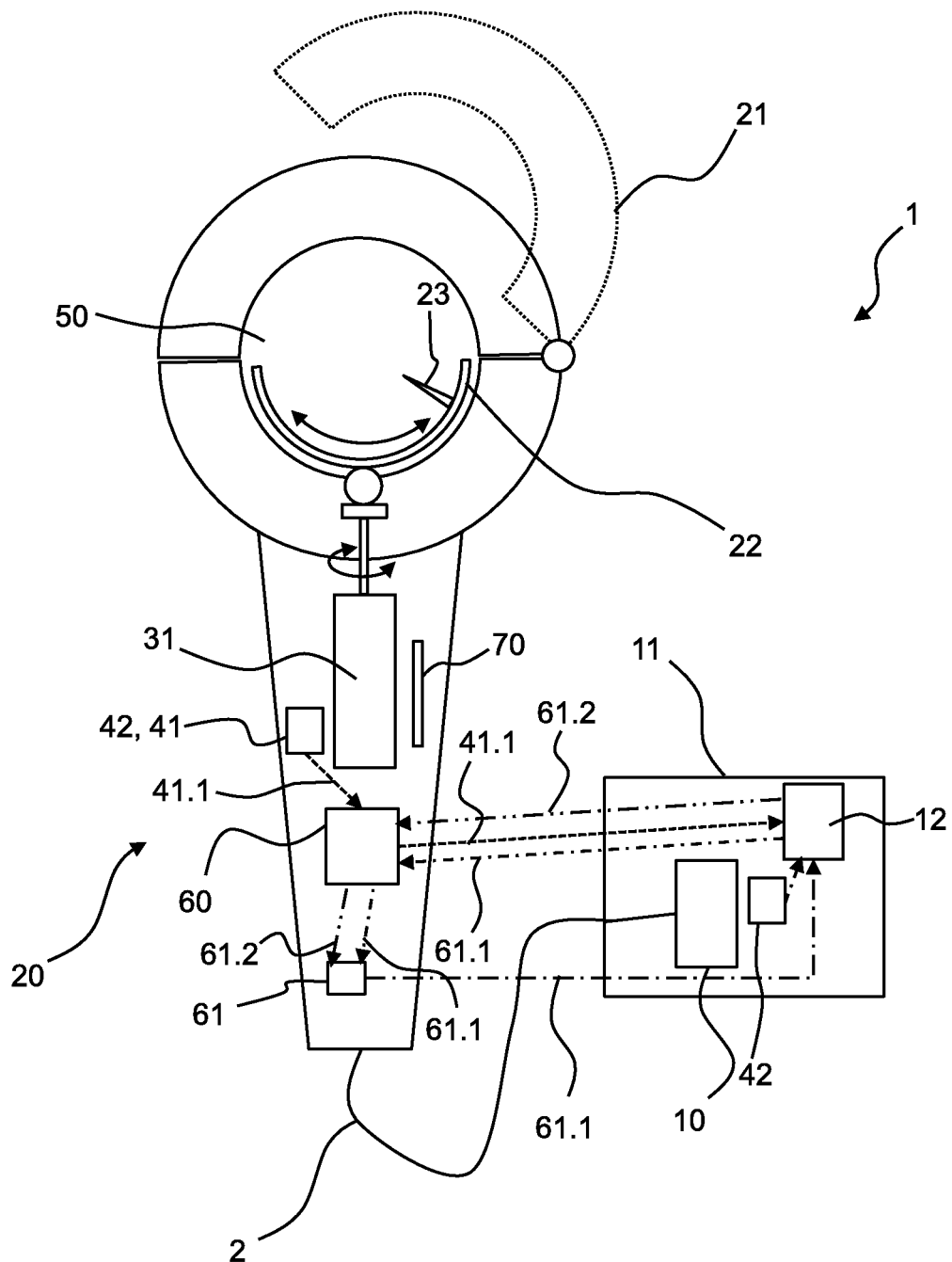
FIG. 4 shows a fourth embodiment, based on the first, second and third embodiments, of a device according to the invention.

A more detailed description of FIG. 4 will be given below. The embodiment is such that the orbital welding head 20 at least partially has the loading sensor 42, the orbital welding head 20 having a battery 70, and the orbital welding head 20 being designed to operate the part of the loading sensor 42 that the orbital welding head 20 has with the aid of the electrical energy provided by the battery 70 and to store one or more of the loading values 61.1 in the memory device 61 by means of the electrical circuit 60. The embodiment is such that the base controller 12 is designed to read out one or more of the loading values 61.1 from the memory device 61 and to emit an alarm signal if one or more of the loading values 61.1 exceeds a threshold value predefined for the respective loading value 61.1. The embodiment is such that the base controller 12 is designed to carry out a calibrating run of the motor 31 and thereby generate the one or more calibrating values 61.2. Here, the electrical circuit 60 is designed to receive one or more of the calibrating values 61.2 from the base controller 12. Here, the base controller 12 is designed to read out one or more of the calibrating values 61.2 from the memory device 61, directly or indirectly via the electrical circuit 60, and to perform open-loop control or closed-loop control of a welding process in dependence on the one or more read-out calibration values 61.2.

Figure 5:
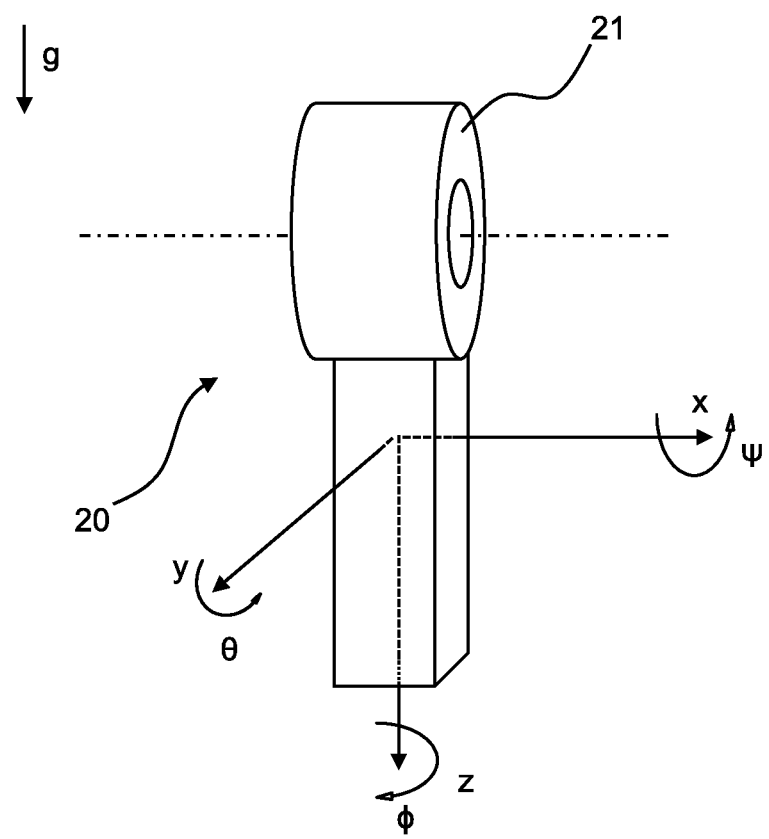
FIG. 5 is an illustration of an exemplary coordinate system for the use of the position sensor.

A more detailed description of FIG. 5 will be given below. The roll-pitch-yaw coordinate system is plotted here with the position sensor position as the origin. A mathematical translation of the origin onto the central axis of the pipe mount is preferably performed (dash-dotted line).

| | Reference designations |
|---|---|
| 1 | Orbital welding device |
| 2 | Cable |
| 10 | Welding current source |
| 11 | Welding current source housing |
| 12 | Base controller |
| 20 | Orbital welding head |
| 21 | Pipe mount |
| 22 | Welding electrode holder |
| 23 | Welding electrode |
| 31 | Motor |
| 41 | Position sensor |
| 41.1 | Position value |
| 42 | Loading sensor |
| 50 | Chamber |
| 60 | Electrical circuit |
| 61 | Memory device |
| 61.1 | Loading value |
| 61.2 | Calibrating value |
| 70 | Battery |
| 90 | Housing |

The invention claimed is:

1. An orbital welding device, the orbital welding device having a welding current source in a welding current source housing and a base controller therein or thereon and having an orbital welding head, which is separate from the welding current source housing and is connected to the welding current source by means of a cable, the orbital welding head having a pipe mount and a welding electrode holder, which is mounted rotatably with respect to the pipe mount and is intended for holding a welding electrode, the orbital welding device having a motor, which is configured to drive the welding electrode holder and thus turn it with respect to the pipe mount, the orbital welding head having a chamber for shielding gas, which is configured to surround a welding electrode of the orbital welding head and substantially seal it off from the outside during a welding process, the orbital welding head having an electrical circuit,
wherein the electrical circuit is connected to a position sensor, the position sensor being configured to generate a position value, the position sensor being arranged in a fixed relative position with respect to the pipe mount and in a movable relative position with respect to the welding electrode holder, and the position value representing an orientation of the pipe mount with respect to gravitational force.

2. The orbital welding device as claimed in claim 1, the electrical circuit or the base controller being configured to calculate in dependence
on the position value and
on a turn value, which represents the turning of the welding electrode with respect to the pipe mount, an orientation value, which represents an orientation of the welding electrode or of the welding electrode holder with respect to gravitational force.

3. The orbital welding device as claimed in claim 2, the electrical circuit being configured to pass on to the base controller the position value or the orientation value calculated.

4. The orbital welding device as claimed in claim 3, the base controller being configured to carry out an open-loop or closed-loop control of the welding process in dependence on the position value or the orientation value.

5. The orbital welding device as claimed in claim 4, the base controller being configured to load a stored welding process program from a memory and the open-loop or closed-loop control of the welding process including a run of the welding process program, the base controller being configured to shift a starting point at which the run of the welding process program begins in dependence on the position value.

6. The orbital welding device as claimed in claim 1, the orbital welding device having a display unit, which is configured to present a graphic representation of the orientation of the welding electrode with respect to gravitational force, the orbital welding device being configured to turn and/or tilt the graphic representation in dependence on the position value.

7. The orbital welding device as claimed in claim 1, wherein the electrical circuit is connected to a memory device, the electrical circuit being configured to store in the memory device at least one of a loading value or a calibrating value, wherein the electrical circuit is configured to store in the memory device at least one of:
   a) at least one of a number, a time period, a maximum current, or a current accumulated over time, corresponding to an electrical charge, of the welding processes carried out with at least one of the welding electrode, the orbital welding head, or arcs,
   b) a number of specific vibrations or
   c) an operating time of the motor,
   as the one or more loading values.

8. The orbital welding device as claimed in claim 1, wherein the electrical circuit is connected to a memory device, the electrical circuit being configured to store in the memory device a loading value, the orbital welding device having a loading sensor and the electrical circuit or the base controller being configured to determine the loading value from a measured value of the loading sensor.

9. The orbital welding device as claimed in claim 8, the orbital welding head at least partially having the loading sensor, and the orbital welding head having a battery, and the orbital welding head being configured to operate the part of the loading sensor that the orbital welding head has with the aid of the electrical energy provided by the battery and to store one or more of the loading values in the memory device by means of the electrical circuit.

10. The orbital welding device as claimed in claim 1, wherein the electrical circuit is connected to a memory device, the electrical circuit being configured to store in the memory device a loading value, the electrical circuit being configured to receive the loading value from the base controller.

11. The orbital welding device as claimed in claim 1, wherein the electrical circuit is connected to a memory device, the electrical circuit being configured to store in the memory device a loading value, the base controller or the electrical circuit being configured to read out the loading value from the memory device and to emit an alarm signal if the loading value exceeds a threshold value predefined for the respective loading value.

12. The orbital welding device as claimed in claim 1, wherein the electrical circuit is connected to a memory device, the electrical circuit being configured to store in the memory device a calibrating value, the base controller or the electrical circuit being configured to carry out a calibrating run of the motor and thereby generate the calibrating value.

13. An orbital welding device, the orbital welding device having a welding current source in a welding current source housing and a base controller therein or thereon and having an orbital welding head, which is separate from the welding current source housing and is connected to the welding current source by means of a cable, the orbital welding head having a pipe mount and a welding electrode holder, which is mounted rotatably with respect to the pipe mount and is intended for holding a welding electrode, the orbital welding device having a motor, which is configured to drive the welding electrode holder and thus turn it with respect to the pipe mount, the orbital welding head having a chamber for shielding gas, which is configured to surround a welding electrode of the orbital welding head and substantially seal it off from the outside during a welding process, the orbital welding head having an electrical circuit,
   wherein the electrical circuit is connected to a memory device, the electrical circuit being configured to store a loading value in the memory device,
   the base controller or the electrical circuit, being configured to carry out a calibrating run of the motor and thereby generate the calibrating value, the calibrating run comprising:
   activating the motor with a defined voltage u1;
   detecting a specific first angular position $\varphi 1$ of the motor or of the welding electrode holder or of a gear part and starting a time measurement at t1;
   detecting a specific second angular position $\varphi 2$ of the motor or of the welding electrode holder or of a gear part and stopping the time measurement at t2; and
   calculating a parameter p as the calibrating value for converting the motor input voltage u1 into the angular velocity $\omega 1$ of the motor or of the welding electrode holder or of a gear part in dependence on $\varphi 1$, $\varphi 2$, t1 and t2.

14. The orbital welding device as claimed in claim 1, wherein the electrical circuit is connected to a memory device, the electrical circuit being configured to store in the memory device a calibrating value, the base controller or the electrical circuit being configured to emit an alarm signal if the calibrating value differs from one or more calibrating values already present in the memory device by more than a predetermined amount.

15. The orbital welding device as claimed in claim 1, the base controller or the electrical circuit being configured to measure the position value or a part of the position value at the beginning, during or at the end of a welding operation and store it in a log file relating to the welding operation.

16. A method for operating an orbital welding device, current being conducted to an orbital welding head from a welding current source by means of a cable, a welding electrode holder being driven by means of a motor and turned with respect to a pipe mount of the orbital welding head, a welding electrode of the orbital welding head being surrounded and substantially sealed off from the outside during a welding process by a chamber for shielding gas, an electrical circuit of the orbital welding head being operated,
   wherein, by means of the electrical circuit, at least one of:
   a position value, generated by a position sensor, which the orbital welding head in this case has, is processed, the position sensor being arranged in a fixed relative position with respect to the pipe mount and in a movable relative position with respect to the welding electrode holder, and the position value representing an orientation of the pipe mount with respect to gravitational force.

* * * * *